United States Patent
Moon et al.

(10) Patent No.: US 10,511,488 B2
(45) Date of Patent: Dec. 17, 2019

(54) DEVICE, SYSTEM AND METHOD FOR PERFORMING INTEGRITY VERIFICATION BASED ON DISTRIBUTED DELEGATOR

(71) Applicant: ELECTRONICS AND TELECOMMUNICATIONS RESEARCH INSTITUTE, Daejeon (KR)

(72) Inventors: Yong Hyuk Moon, Daejeon (KR); Dae Won Kim, Daejeon (KR); Young Sae Kim, Daejeon (KR); Seung Yong Yoon, Daejeon (KR); Jin Hee Han, Daejeon (KR); Jae Deok Lim, Sejong (KR); Jeong Nyeo Kim, Daejeon (KR); Yong Sung Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 336 days.

(21) Appl. No.: 15/226,294

(22) Filed: Aug. 2, 2016

(65) Prior Publication Data
US 2017/0317889 A1 Nov. 2, 2017

(30) Foreign Application Priority Data
Apr. 27, 2016 (KR) .................. 10-2016-0051667

(51) Int. Cl.
*H04L 12/24* (2006.01)
*G06F 16/23* (2019.01)
*H04L 29/08* (2006.01)

(52) U.S. Cl.
CPC .......... *H04L 41/14* (2013.01); *G06F 16/2365* (2019.01); *H04L 67/025* (2013.01); *H04L 67/10* (2013.01)

(58) Field of Classification Search
CPC .... H04L 41/14; H04L 67/10; G06F 17/30371
USPC ........................................ 709/223
See application file for complete search history.

(56) References Cited

U.S. PATENT DOCUMENTS

| | | | |
|---|---|---|---|
| 2005/0059352 A1 | 3/2005 | McLean | |
| 2006/0190798 A1* | 8/2006 | Korkishko | G06F 11/08 714/758 |
| 2006/0190996 A1* | 8/2006 | Korkishko | G06F 21/57 726/9 |

(Continued)

FOREIGN PATENT DOCUMENTS

| | | |
|---|---|---|
| KR | 10-2006-0119967 A | 11/2006 |
| KR | 10-2007-0069435 A | 7/2007 |
| KR | 10-2016-0008507 A | 1/2016 |

*Primary Examiner* — Joseph L Greene
(74) *Attorney, Agent, or Firm* — LRK Patent Law Firm

(57) ABSTRACT

A system for performing an integrity verification based on a distributed delegator and verifying an integrity of a plurality of individual devices based on a network includes: a first individual device which is an integrity verification target of the plurality of individual devices; a second individual device configured to vicariously verify the verification target device of the plurality of individual devices; and a remote device management server configured to select the second individual device of the plurality of individual devices as a verification delegator, and to receive a result of integrity verification of the first individual device by the second individual device.

16 Claims, 12 Drawing Sheets

(56) References Cited

U.S. PATENT DOCUMENTS

| | | | |
|---|---|---|---|
| 2011/0041003 A1* | 2/2011 | Pattar | H04W 12/10 |
| | | | 714/4.3 |
| 2014/0250215 A1* | 9/2014 | Bowen | G06F 21/57 |
| | | | 709/223 |
| 2015/0121072 A1 | 4/2015 | Choi et al. | |
| 2015/0271679 A1 | 9/2015 | Park et al. | |
| 2015/0319180 A1* | 11/2015 | Falcou | H04L 63/0846 |
| | | | 726/7 |

* cited by examiner

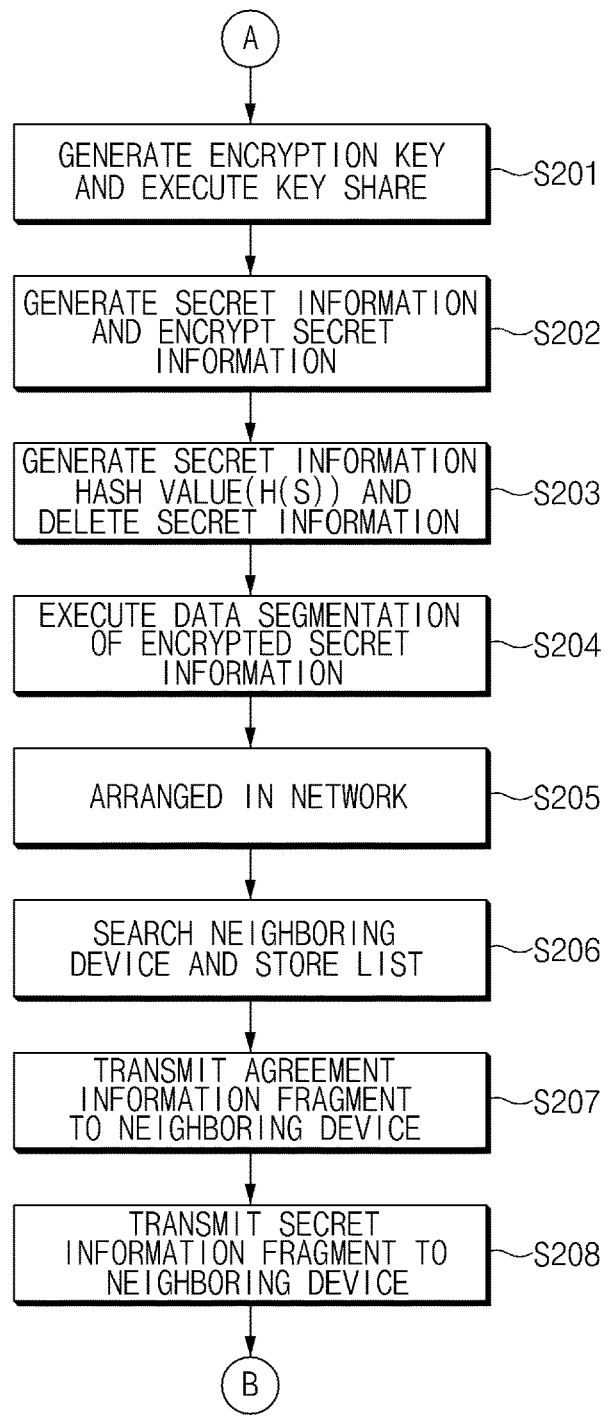

DEVICE, SYSTEM AND METHOD FOR PERFORMING INTEGRITY VERIFICATION BASED ON DISTRIBUTED DELEGATOR

CROSS-REFERENCE TO RELATED APPLICATION

This application claims the benefit of priority to Korean Patent Application No. 10-2016-0051667, filed on Apr. 27, 2016 in the Korean Intellectual Property Office, the disclosure of which is incorporated herein in its entirety by reference.

BACKGROUND OF THE INVENTION

1. Field of the Invention

The present disclosure relates to a device, a system, and a method for performing an integrity verification based on a distributed delegator, and more particularly, to a technology of proving an integrity of mutual memory based on a multilateral cooperation of individual devices in the form of minimizing the intervention of a separate trust entity or a central server.

2. Description of the Related Art

Recently, as various small devices that perform specialized sensing and actuation functions are widely used, general-purpose or special-purpose products are frequently released. These devices are operated generally based on an operating system or a firmware which is functionally very lightweight, and provides a limited or standardized function.

Meanwhile, since most of these end-point devices are configured to provide various network interfaces rather than a computing (calculating) performance, it is possible to provide a strong connection function. A connectivity between devices is one of very important factors for providing a service continuity. For example, as the end-point devices are able to participate in the IP-based Internet, technological and industrial advances implementing that all devices are connected to a network are potentially predicted. That is, there is a structural feature that the connectivity between devices is directly related to the productivity of service.

In a device network environment based on the strong connectivity, operating defects and errors of an entire network may be caused by an attack such as an addition of malicious code to some individual devices, and the network may be easily exposed to security vulnerabilities such as a machine-to-machine spread of malicious code.

SUMMARY OF THE INVENTION

The present disclosure has been made in view of the above problems, and provides a device, a system, and a method for performing an integrity verification based on a distributed delegator capable of processing an integrity attestation procedure for an execution environment of an individual device based on a mutual cooperation of neighboring devices not by an outer sole entity in a network environment configured by devices based on a relatively strong connectivity compared with a computing power, and of performing an integrity verification based on a distributed delegator that can guarantee the reliability of device operation which is most critical basis in the implementation and the operation of all types of device-related security services.

In accordance with an aspect of the present disclosure, a system for performing an integrity verification based on a distributed delegator and verifying an integrity of a plurality of individual devices based on a network includes: a first individual device which is an integrity verification target of the plurality of individual devices; a second individual device configured to vicariously verify the verification target device of the plurality of individual devices; and a remote device management server configured to select the second individual device of the plurality of individual devices as a verification delegator, and to receive a result of integrity verification of the first individual device by the second individual device. The system further includes a third individual device which is adjacent to the first individual device or the second individual device of the plurality of individual devices. The remote device management server generates agreement information of the plurality of individual devices and distributes the agreement information to the plurality of individual devices. The remote device management server receives the agreement information on the second individual device from the third individual device and confirms the verification delegator selection of the second individual device when the second individual device is selected as the verification delegator. The plurality of individual devices generate secret information and distribute the secret information to the remaining plurality of individual devices excluding themselves. The second individual device selected as the verification delegator by the remote device management server collects the secret information from the remaining plurality of individual devices excluding itself, and restores the collected secret information to generate a challenge data based on the secret information. The second individual device transmits the challenge data to the first individual device which is a verification target device in a form of nonce, and verifies an integrity of the first individual device by checking a response of the first individual device. Each of the plurality of individual devices includes: a random data generator configured to generate at least one of the secret information, a nonce, and an encryption key; a verification data repository configured to store the agreement information received from the remote device management server, the secret information, the nonce, and the encryption value; a memory traversal unit configured to perform memory scan and data extraction when evaluating a reliability of the verification delegator and measuring an integrity of the verification target device; and a checksum calculator configured to calculate a checksum for evaluating the reliability of the verification delegator and measuring the integrity of the verification target device. The system further includes a verification delegator selector configured to generate a challenge data based on the secret information when an individual device of the plurality of individual devices is a verification delegator. The system further includes a verifier reliability determiner configured to determine the reliability of the second individual device when an individual device of the plurality of individual devices operates as a third individual device. The system further includes a distribution verification determiner configured to perform an integrity verification for the first individual device when receiving a response to the challenge from the first individual device which is the verification target device, when an individual device of the plurality of individual devices operates as a second individual device. The system further includes a neighboring device seeker configured to search a device which is first arranged in a network among the plurality of devices.

In accordance with another aspect of the present disclosure, an individual device for performing an integrity verification based on a distributed delegator and performing an integrity verification by being linked with a remote device management server includes: a random data generator configured to generate at least one of secret information, a nonce, and an encryption key; a verification data repository configured to store agreement information received from the remote device management server, the secret information, the nonce, and the encyption value; a memory traversal unit configured to perform memory scan and data extraction when evaluating a reliability of a verification delegator and measuring an integrity of a verification target device; a checksum calculator configured to calculate a checksum for evaluating the reliability of the verification delegator and measuring the integrity of the verification target device: a verification delegator selector configured to generate a challenge data based on the secret information when the individual device is selected as the verification delegator; a verifier reliability determiner configured to determine a reliability of the individual device selected as the verification delegator; and a distribution verification determiner configured to transmit a challenge data to the verification target device, and to perform an integrity verification for the verification target device when receiving a response to a challenge from the verification target device.

In accordance with another aspect of the present disclosure, a method for performing an integrity verification of an individual device based on a distributed delegator and being performed by linking a plurality of individual devices connected based on a network with a remote device management server includes: receiving a request of integrity verification for a verification target device which is one of the plurality of individual devices; selecting a verification delegator from among remaining individual devices excluding the verification target device of the plurality of individual devices; and verifying an integrity of the verification target device by the individual device selected as the verification delegator. The method further includes: storing agreement information distributed from the remote device management server; and generating secret information to store and share. Selecting a verification delegator includes: generating a verification selection reference value for selecting the verification delegator and comparing with a preset arbitrary random value; and determining that it is possible to be selected as the verification delegator and reporting to the remote device management server, when the verification selection reference value is less than the random value. Selecting a verification delegator further includes finally selecting the individual device as the verification delegator, when receiving a final selection result by agreement information of the verification target device or neighboring devices of the verification delegator among the plurality of individual devices from the remote device management server. Verifying an integrity of the verification target device includes: collecting the secret information from the neighboring device by the individual device selected as the verification delegator; generating a challenge data based on the secret information and transmitting to the verification target device; receiving a response from the verification target device; and verifying the integrity of the verification target device based on the response. The method further includes reporting an integrity verification result of the verification target device to the remote device management server by the verification delegator.

BRIEF DESCRIPTION OF THE DRAWINGS

The objects, features and advantages of the present disclosure will be more apparent from the following detailed description in conjunction with the accompanying drawings, in which:

FIG. 5 is a flowchart illustrating in detail an execution process Of a secret information initialization procedure of FIG. 3:

DETAILED DESCRIPTION OF EXEMPLARY EMBODIMENTS

Exemplary embodiments of the present disclosure are, described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure relates to a technology of evaluating a security defect in an execution environment of an embedded, a mobile, and an internet of things devices, and to a technology of confirming a dynamic integrity of individual device memory reliably. The present disclosure discloses a mutual memory integrity attestation method based on a device multilateral cooperation in the form of minimizing the intervention of a separate trust entity or a central server.

In addition, the present disclosure relates to a technology capable of processing a proactive security procedure as an offline process depending on a computing power of a remote device management server during a network arrangement of an arbitrary device, dynamically selecting a verification delegator according to a reliable procedure based on the cooperation of neighboring devices, and performing an attestation for a target device which required an integrity verification, by not entrusting the structure of decision making for the integrity verification to an external entity such as a remote server, but assigning to a distribution device resource configuring a device network, in order to perform an autonomous and cooperative attestation procedure.

Hereinafter, exemplary embodiments of the present disclosure are described with reference to FIGS. 1 to 10 in detail.

Figure 1:
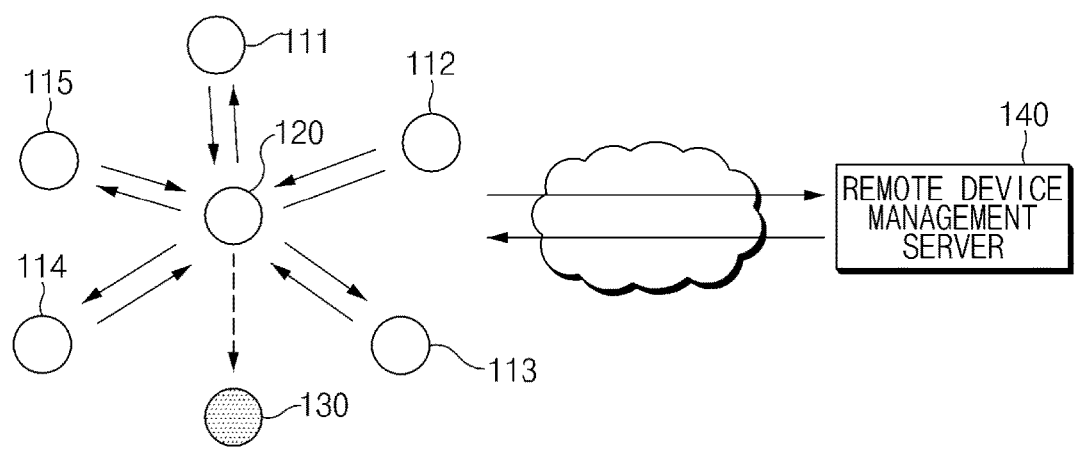
FIG. 1 is a diagram illustrating a configuration of a system for performing an integrity verification of an individual device based on a distributed delegator according to an embodiment of the present disclosure.

FIG. 1 is a diagram illustrating a configuration of a system for performing an integrity verification of an individual device based on a distributed delegator according to an embodiment of the present disclosure.

The system for performing an integrity verification of an individual device based on a distributed delegator according to an embodiment of the present disclosure may include autonomous devices 111 to 130, and 120 and a remote device management server 140.

In this case, the autonomous devices 111 to 130 may include neighboring devices 111, 112, 113, 114, 115 around a verification delegator 120, and a verification target device 130.

The neighboring device 111 means devices belonging to the same domain. In particular, in the present disclosure, it means an adjacent network node around the verification delegator 120 which is described later. In this case, neighboring devices 112, 113, 114, 115 may be included as a network node adjacent to the verification delegator 120.

The verification delegator 120 means a device selected as a subject for performing an attestation procedure and finally determining the result of an attestation among arbitrary devices configuring a device network. The verification delegator 120 is selected through a dynamic cooperation with the neighboring device 111 and a proactive aid with the remote device management server 140 which is described later, and a detailed selection procedure is described later through FIGS. 4A to 7.

The verification target device 130 means a device that is a target of the memory integrity verification, and it is assumed that a verification event is generated by the remote device management server 140 which is described later or by the verification target device's own determination.

The autonomous devices 111 to 130 may be linked with the remote device management server 140 via a network. The network means a TCP/IP-based internet environment which is separated from a device network. In the present disclosure, it is assumed that data communication between devices or between a device and the remote device management server 140 which is described later is performed on the basis of mutual authentication, secure key exchange, encrypted session, or the like based on a conventional security technology.

The remote device management server 140 means a computing entity which has an excellent calculation performance in comparison with an individual device, and is assumed to be an entity which exists in a remote area separated from the device network and can be trusted to be secure. This entity may be referred to as a gateway according to a configuration characteristic of service intended by the device network.

The configuration of the device network described in FIG. 1 is just an example which can be considered from among various network configurations, and thus the formation of the network device is not limited to the configuration shown in FIG. 1.

FIG. 1 is briefly described based on the role of each entity performing a key function in the present disclosure to aid easy understanding of the network device. However, the structure can be easily understood by a person who has a general technical knowledge related to a computer, a network, a security, and a hardware.

Figure 2:
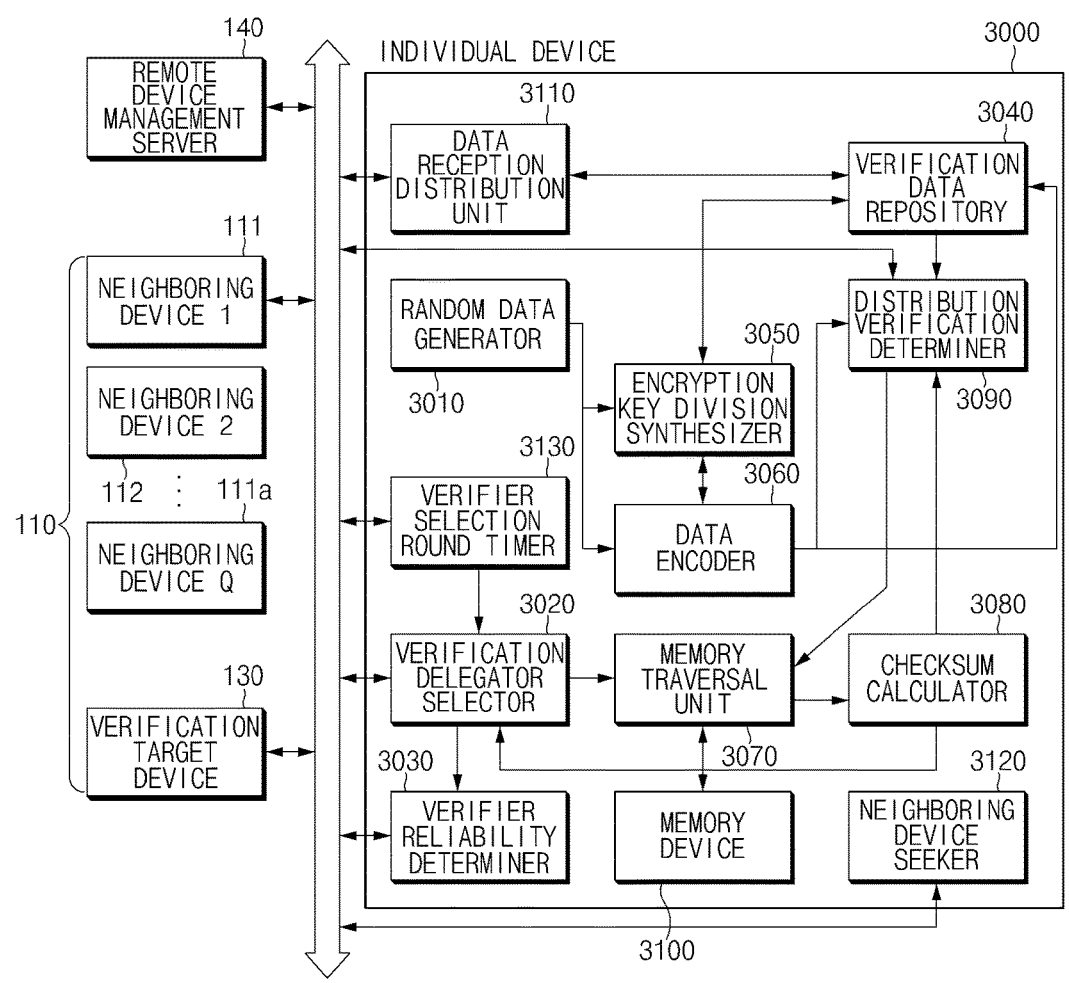
FIG. 2 is a diagram illustrating a detailed configuration of an individual device according, to an embodiment of the present disclosure.

FIG. 2 is a diagram illustrating a detailed configuration of an individual device according to an embodiment of the present disclosure.

FIG. 2 illustrates a system configuration of the individual device configuring the device network which is implemented in terms of autonomous distributed attestation function in the form of software and hardware modules (function block).

Referring to FIG. 2, an individual device 3000 according to an embodiment of the present disclosure means a computing terminal which performs a power on self-test (POST) and a boot media scan which are a proactive measure necessary for booting and loads a boot loader by a booting control code immediately after power is applied, and then boots kernel to start an operating system, and is able to install and execute a software. In addition, the individual device 3000 may not be equipped with an operating system but may be configured as a firmware type which can perform a network function for simply accomplishing a machine-to-machine communication, a server-to-server communication, a sensing/actuation function, and a function relating to an attestation procedure.

In more detail, the individual device 3000 may include an application processor (AP), memory, storage, ROM, a user interface, and devices.

Illustratively, this device may include at least one of a computer, a handheld computer, an Ultra Mobile PC (UMPC), a workstation, a net-book, PDA, a portable computer, a web tablet, a wireless telephone, a mobile phone, a smart phone, a digital camera, a digital audio recorder, a digital audio player, a digital picture recorder, a digital picture player, a digital video recorder, a digital video player, a device that can transmit and receive information in a wireless environment, and various computing systems configuring a home network.

Meanwhile, the individual device 3000 is illustratively shown from a function block point of view by focusing the internal system configuration of an arbitrary terminal configuring the device network on the suggestions for performing an autonomous distributed attestation technique.

The individual device 3000 according to an embodiment of the present disclosure may include a random data generator 3010, a verification delegator selector 3020, a verifier reliability determiner 3030, a verification data repository 3040, an encryption key division synthesizer 3050, a data encoder 3060, a memory traversal unit 3070, a checksum calculator 3080, a distribution verification determiner 3090, a memory device 3100, a data reception distribution unit 3110, a neighboring device seeker 3120, and a verifier selection round timer 3130.

This configuration may be easily added and merged to be operated in various computing devices suggested in the above example, the configuration is not limited to the example suggested in FIG. 2, and the reduction, the addition, and the expansion of a function block may be easily implemented according to the service environment. In addition, an internal function block configuring this device may be implemented in the form of a software or hardware module, and the implementation type may be determined according to the requirements of a corresponding service and the policy of service provider. In addition, the operating system or the firmware configuring this device is not limited to a specific technological concept but may embrace various technologies available in the related art.

The random data generator 3010 refers to a block that performs the function of directly generating an arbitrary data such as agreement information, an encryption key, secret information, nonce, and the like, or the function of generating a seed value required for the generation of those data. Accordingly, this module serves to generated and transmit a seed value necessary for performing the function of the encryption key division synthesizer 3050, and the data encoder 3060 which is described later.

The verification delegator selector 3020 may perform two types of operations like the below description depending on the role of the individual device 3000.

First, when the individual device 3000 participates in the attestation process as a neighboring device, the verification delegator selector 3020 may transmit a challenge value which is previously distributed to the individual device by a corresponding verification delegator to a first selected verification delegator, and perform a function that requires a corresponding correct response. When a relevant response is received from the first selected verification delegator, the verification delegator selector 3020 may transmit the response to the verifier reliability determiner 3030 which is described later to require a final determination.

Meanwhile, when the individual device 3000 participates in the attestation process as the first selected verification delegator, this module may perform the function of receiving a challenge value from the neighboring devices which are described later. The challenge value may be transmitted to the memory traversal unit 3070 which is described later in order to receive the challenge value and calculate a corresponding correct response value.

The verifier reliability determiner 3030 may be used only when the individual device 3000 serves as the neighboring device. In detail, when the individual device 3000 participates in the attestation process as the neighboring device, when receiving the determination request from the verification delegator selector 3020, the verifier reliability determiner 3030 may compare the previously stored response value with the response value newly received from the first selected verification delegator, and determine whether to agree the reliability of the selection of the verification delegator. That is, when the comparison value of the two values are the same, the verifier reliability determiner 3030 may transmit the result "agreement", otherwise, transmit the result "objection" to the remote device management server 140.

The verification data repository 3040 may serve to receive agreement information generated by the remote device management server 140 which is described later from the data reception distribution unit 3110 which is described later before the distribution, and temporarily store the received agreement information. In addition, the verification data repository 3040 may serve to store data related to secret information internally generated in the individual device before the individual device 3000 is arranged in the network. The agreement information stored in the verification data repository 3040 may be deleted immediately after the distribution so that it is possible to prevent the vulnerability due to a data leakage. In addition, the secret information may be divided and encrypted to be deleted immediately after the distribution, or may store fragmented secret information if needed. The risk of the original secret information recovery from the fragmented secret information may be blocked due to an encryption key fragmentation and sharing which are described later in FIG. 8, and a singular point in the information encoding technique.

Meanwhile, the verification data repository 3040 may be safely stored and managed through a storage protection function such as a conventional encryption. Meanwhile, the verification data repository 3040 may receive a plurality of secret information fragments from the data encoder 3060 described below, and request the data reception distribution unit 3110 which is described later to distribute the secret information fragment to the neighboring device.

The encryption key division synthesizer 3050 may perform a key division and key division synthesis function.

The encryption key division synthesizer 3050 may serve to generate an encryption key used for a safe distribution, storage and recovery of the secret information in order to divide a key, encrypt original secret information generated by the individual device 3000, and divide the key into sub-keys of specific number in order to prevent an exposure of the previously generated encryption key. The divided sub-keys may be transmitted to the data encoder 3060 which is described later in order to generate a secret information fragment.

The encryption key division synthesizer 3050 may serve to synthesize the sub-keys which are collected through the data reception distribution unit which is described later and stored in the verification data repository 3040 to restore an original encryption key, and to decrypt the encrypted secret information by using the restored encryption key, when a trustworthy individual device 3000 desires to recover its own original secret information in order to synthesize a key.

The above described key division and key synthesis may be easily designed and implemented by a conventional technique such as Shamir secret sharing and be operated in a system.

The data encoder 3060 may perform the information fragmentation and the information recovery. The data encoder 3060 may convert the original secret information encrypted by the encryption key division synthesizer 3050 into several pieces of symbol to be fragmented in order to achieve a information fragmentation. As a result of this function, a plurality of data segments may be obtained. In addition, the data encoder 3060 may combine the division sub-keys with the data segment generated in this step in pairs by the encryption key division synthesizer 3050 to generate a plurality of secret information fragments to transmit to the verification data repository 3040.

The data encoder 3060 may be able to recover the encrypted original secret information when a specific number of data segments or more are secured.

The above described information fragmentation and information recovery technique may be easily designed and implemented by a conventional technique such as an erasure coding and be operated in a system.

The memory traversal unit 3070 may perform the memory scan and the data extraction when evaluating the reliability of the first selected verification delegator and measuring the integrity of the verification target device 130.

When the individual device 3000 serves as the verification delegator, more specifically, when the individual device 3000 is first selected as the verification delegator, the neighboring devices may transmit a challenge to the verification delegator selector 3020 in order to evaluate the reliability of the first selected verification delegator. In this case, it is first performed in order to generate a response value for a corresponding challenge that the traversal of a memory area which was referred to during the generation of a corresponding challenge is accomplished to extract Bytes to transmit to the checksum calculator 3080 which is described later. The checksum calculator 3080 may perform such a memory traversal function.

When the individual device 3000 serves as the verification target device, in order to generate a response value for the challenge which is transmitted to evaluate its execution environment by the verification delegator, the distribution verification determiner 3090 which is described later may receive a memory area traversal request corresponding to the pertinent challenge, and extract Bytes to transmit to the checksum calculator 3080 which is described later.

The checksum calculator 3080 may perform a checksum calculation function when evaluating the reliability of the first selected verification delegator and measuring the integrity of the verification target device 130.

When the individual device 3000 serves as the verification delegator, the checksum calculator 3080 may generate a checksum value by using the memory data and the related data received from the memory traversal unit 3070, and transmit a corresponding value to the distribution verification determiner 3090 which is described later. A detailed example is described in FIG. 9B.

When the individual device 3000 serves as the verification delegator, the checksum calculator 3080 may generate a checksum value by using the memory data and the related data received from the memory traversal unit 3070, and transmit a corresponding value to the verification delegator selector 3020.

The distribution verification determiner 3090 may serve when the verification delegator performs an integrity verification determination, and when the verification target device 130 verifies its own arbitrary memory area. When the individual device 3000 is selected finally as a reliable verification delegator, the distribution verification determiner 3090 may generate a challenge-purposed nonce vector by using the original secret information obtained from the encryption key division synthesizer 3050 and the data encoder 3060, and transmit the nonce to the verification target device 130 which is described later. In addition, the distribution verification determiner 3090 may generate a correct answer value for a corresponding nonce value and compare with the challenge value received from the verification target device 130 which is described later. If the two values are the same, the distribution verification determiner 3090 may determine that the integrity of the execution environment of the verification target device 130 is 'normal', and, otherwise, determine as "abnormal", and then, report this result to the remote device management server 140 which is described later. A detailed example is described in FIG. 9A.

When the individual device 3000 serves as the verification target device, the distribution verification determiner 3090 may use the memory traversal unit 3070 and the checksum calculator 3080 in order to generate a response value for the challenge value received from the verification delegator, and transmit the obtained response value to the verification delegator.

The memory device 3100 is a hardware memory chip for the purpose of storing a program and data. The memory device 3100 may allow the access and the read/write operations of a software module through a conventional I/O driver. In addition, the hardware structure of this device may embrace various conventional techniques, and illustratively, may consider the memory hardware of the von Neumann structure and the memory hardware of the Harvard structure.

The data reception distribution unit 3110 may receive the agreement information from the remote device management server 140, and transmit the agreement information to the verification data repository 3040, and distribute the agreement information fragment and the secret information fragment received from the verification data repository 3040 to a plurality of neighboring devices which is described later.

The neighboring device seeker 3120 may detect whether the individual device 3000 is first arranged, or detect whether the existence of a neighboring device is changed. As a result of the neighboring device seeker 3120, the individual device 3000 may obtain the latest list of neighboring devices. In addition, the seek for the neighboring devices may be performed by the Ad-hoc or Tree scheme, and, illustratively, may be easily accomplished by utilizing a conventional Gossiping protocol.

The verifier selection round timer 3130 may serve to manage an execution environment integrity verification cycle for a specific device in the form of a round unit in the individual device. Each individual device 3000 may possess its own round timer, and may go through first the initialization and the activation steps during a network arrangement. At this time, a round value may be set through a synchronization with other neighboring devices. When a specific event (e.g., verification request from remote device management server, request of operating system update and verification from specific individual device, etc.) occurs in an arbitrary round, the individual devices may determine whether they are able to serve as a verification delegator of this round by using the factors described in below equation. In more detail, the random generation number of the individual device θ is larger than a selection threshold value T, the individual device may be first selected as the verification delegator, and may distribute a message "first verification, delegator selection complete" to neighboring devices so as to prevent an additional selection of other neighboring devices. The neighboring devices which received this message may halt the verification delegator selection process. Thus, the verifier selection round timer 3130 may determine whether the verification delegator selector 3020 shall serve as the neighboring device or serve as the first selected verification delegator.

$$\text{Compare } T=CF(r) \text{ with } \theta \qquad \text{[Equation 1]}$$

T: selection threshold value, CF(•): verification delegator determination function, r: round value, θ: random generation value In this case, the determination function may be defined by reflecting the characteristics of the network environment in which the device is arranged by a service provider and an administrator, and may be easily designed to be extended and implemented in such a manner that the individual device which participated as a verification delegator once or more times within a specific round is not able to be selected as a verification delegator in the current round.

The remote device management server 140 means an entity that performs an off-line process relating to the generation of the agreement information, transmits the generated agreement information to the individual devices 3000, determines the execution environment attestation time of a specific device if necessary, issues a reliability assurance ticket to the verification delegator according to the reliability evaluation result of the verification delegator, receives a report of the reliability evaluation result of the verification target device 130, and accomplishes an appropriate response procedure for the verification target device according to the received result.

A network configuration device 110 means a device set formed by the individual device 3000, a set of neighboring devices which is described later, and the verification target device 130, and the data communication between devices or between the device and the remote device management server 100 may be performed through various conventional wired and wireless network interfaces.

A neighboring device 1 (111) means a device formed by the same function blocks as the above described individual device 3000, and in particular, means a device adjacent to the individual device 3000. In FIG. 2, it is assumed that Q neighboring devices form a device network with the individual device 3000.

The verification target device 130 may be formed by the same function blocks as the above described individual device 3000, and means a device which is the target of the execution environment integrity verification. Thus, it may become the target of the attestation process of the verification delegator and, at the same time nay be isolated from the device network by the remote device management server 140 according to the determination result.

For convenience, each block of a flowchart in the present disclosure means a separate execution process and the physical and the logical subjects of the execution is specified when the execution procedure of each block is described. This is identically applied to FIGS. 3 to 9B.

Hereinafter, an autonomous device integrity verification method based on a distributed verification delegator of the present disclosure is illustrated with reference to FIG. 3.

First, the remote device management server 140 may perform the generation of agreement information of a corresponding device, before the network arrangement of an arbitrary individual device. At this time, when, a corresponding device is selected as the verification delegator later, the agreement information is used to receive confirmation of the reliability of the device from a neighboring device. The remote device management server 140 may calculate the agreement information by using memory byte information and layout information of the device (S100). A relevant specific processing procedure is described later in FIG. 4A AND FIG. 4B.

The individual device 3000 which will be arranged in the network may generate the secret information which will be distributed to the neighboring device 111 (S200). When the individual device 3000 is first selected later as the verification delegator and the reliability of the individual device 3000 is confirmed, the secret information is used to generate the challenge-purposed nonce data used in the integrity verification process of the verification target device 130. The procedure of the cryptographic key generation, the encryption key division, the secret data generation, the secret data encryption, and the secret data encoding is performed for the generation of the secret information. A relevant specific processing procedure is described later in FIG. 5.

When a critical event such as the update of a device's operating system or a firmware occurs, the remote device management server 140 or an update target device may generate a verification delegator selection event in a specific round, and thus, the neighboring devices 111 to 111Q may determine whether they can be selected first as the verification delegator (S300). A relevant specific processing procedure is described later in FIG. 6.

A specific device selected as the first verification delegator may be selected as a final verification delegator by getting the rest neighboring device's agreement on the reliability. The neighboring device may notify the reliability of the first selected verification delegator to the remote device management server 140, and the remote device management server 140 may make a final decision (S400).

In this step, agreement information which is generated at step S100 and distributed to the neighboring devices is used. A relevant specific processing procedure is described later in FIG. 7.

After being selected as the final verification delegator, the specific device may be given a confirmation ticket for the reliability from the remote device management server 140, and based on this, collect the secret information distributed to the neighboring devices 111 to 111Q, and recover the original secret information in the opposite way to the procedure of generating the secret information at step S200 (S500). A relevant specific processing procedure is described later in FIG. 8.

The verification delegator may generate challenge data by using the recovered original secret information as a seed, transmit the generated challenge data to the verification target device in the nonce form, and verify the integrity of the execution environment of the device by checking the response for a corresponding challenge of the verification target device 130 (S600). In this step, the execution environment may illustratively mean a memory. A relevant specific processing procedure is described later in FIG. 9A and FIG. 9B.

The verification delegator may report the final decision result of the attestation procedure performed for the verification target device at step S600 to the remote device management server 140. The remote device management server 140 may perform a corresponding function such as the isolation of the verification target device from the network, if the decision result is abnormal (S700).

Hereinafter, the agreement information initialization procedure execution process (S100) of FIG. 2 is described in detail with reference to FIG. 4A.

The individual device intended to be arranged on the network may install an operating system (or a firmware) (S101).

The remote device management server 140 may extract and obtain memory layout information (e.g., memory size, memory address, task control block (TCB) arrangement information, etc.) of the individual device to be arranged in the network and an operating system image data loaded in the memory (S102). In this step, it is realistic to assume that the operator of the remote device management server or the server knows information on a hardware specification of the individual device and an operating system.

The remote device management server 140 may generate a random nonce vector(RNV) like a following Equation so as to specify an area for the memory traversal of a corresponding device by using the memory layout information and the operating system image data extracted from the individual device (S103). It is assumed that the random nonce vector s configured by r nonce data as shown in Equation 2 below.

$$\text{Nonce: } \lambda_1, \lambda_2, \lambda_3, \ldots, \lambda_r \qquad \text{[Equation 2]}$$

The remote device management server 140 may extract the nonce value from the RNV in turn, and, by using this value, generate a memory offset value to be used to specify an area for the memory traversal (S104). This procedure is described in detail in FIG. 4B which will be described later.

The remote device management server 140 may traverse a specific memory area by using the obtained memory offset value to extract memory Bytes value and provide it to the checksum calculator 420 (S105). This procedure is described in detail in FIG. 4B which will be described later.

The checksum calculator 420 of the remote device management server 140 may generate a unique checksum value by using the Bytes value extracted from the traversed memory area (S106). Thus, the remote device management server 140 may obtain a unique checksum vector (UCV) for the individual device as the following Equation 3 (S106). It is assumed that this unique checksum vector is configured by r checksum data.

Checksum: $\mu_1, \mu_2, \mu_3, \ldots, \mu_r$ [Equation 3]

The RNV and UCV values formed by the above step S105 and step S106 may be formed in pairs as shown in the following Equation 4 to generate an agreement information fragment (Agreement Fragment) (S107). At this time, the UCV value may be used by generating a digest value of a corresponding UCV by using a hash function H(•). The information in the below may be moved to and stored in the individual device which will be arranged in the network from the remote device management server 140.

Agreement fragment→$\{<\lambda_1,H(\mu_1)>,<\lambda_2,H(\mu_2)>,<\lambda_3,H(\mu_3)>, \ldots, <\lambda_r,H(\mu_r)>\}$ [Equation 4]

Figure 4A:
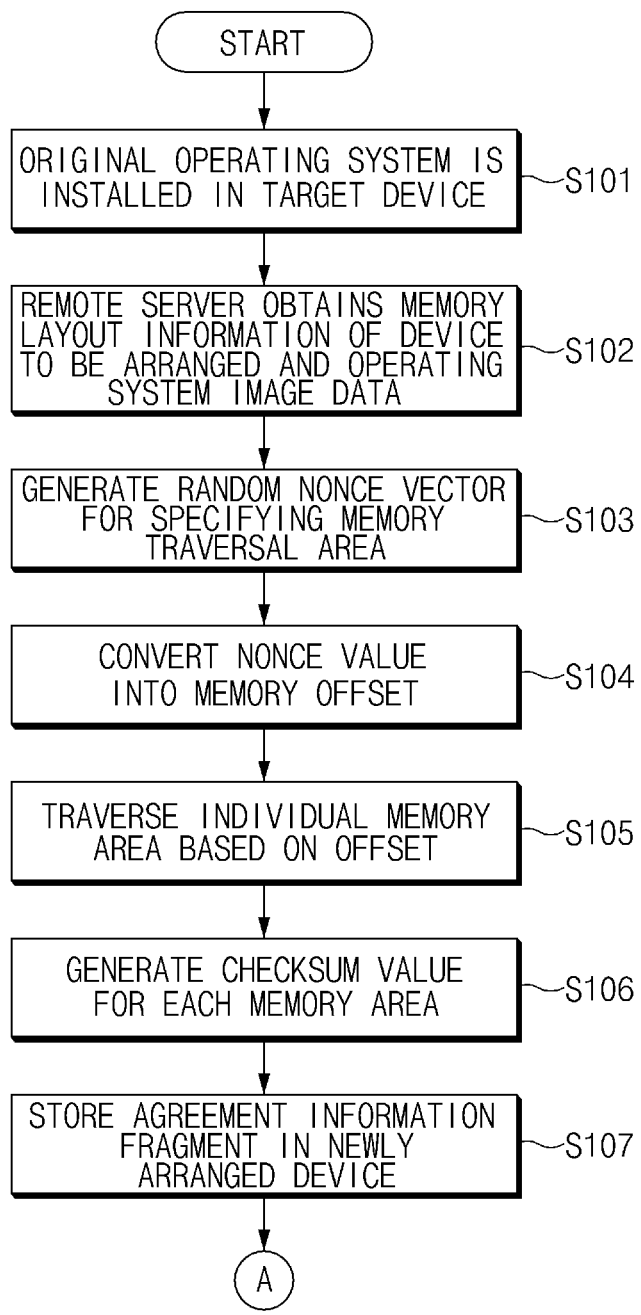
FIG. 4A is a flowchart illustrating in detail an execution process of an agreement information initialization procedure of FIG. 3.
Figure 4B:
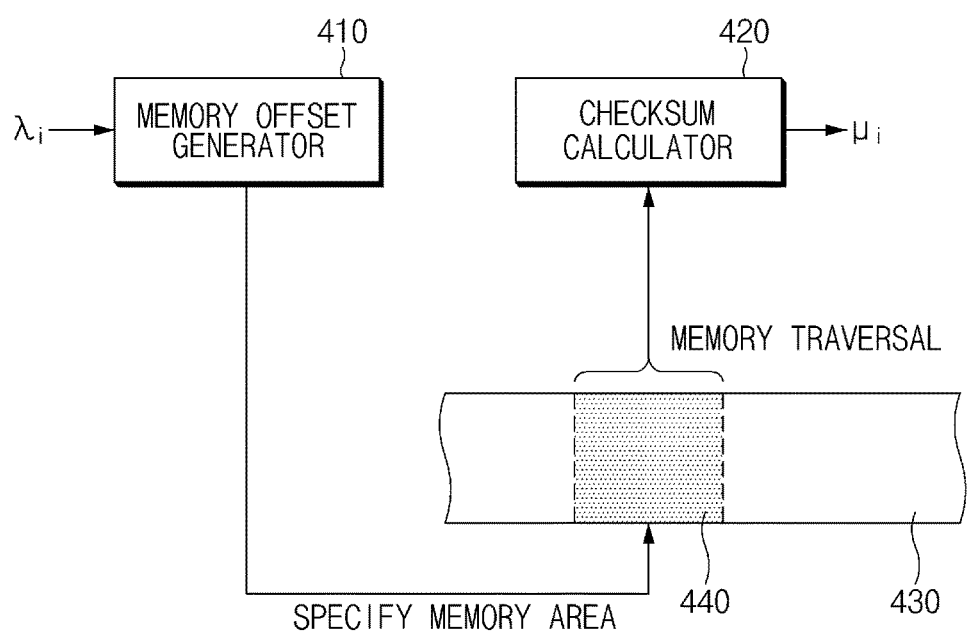
FIG. 4B is a structure diagram of generating an agreement fragment of FIG. 4A.

FIG. 4B is a structure diagram of generating an agreement fragment of FIG. 4A.

The random nonce □i means a i-th random nonce value extracted from the RNV.

A memory offset generator 410 may serve to generate the offset value of the memory area to be traversed by using an arbitrary random nonce value extracted from the RNV.

A checksum calculator 420 may receive the memory byte value obtained as a result of the memory traversal as an input value and generate a unique checksum value corresponding to a relevant memory byte value. For reference the generated unique checksum value may serve as a kind of security identifier for the memory byte.

The checksum value μi means a i-th checksum value calculated from the i-th random nonce value.

A device memory 430 means a memory device for storing a data and a program in the individual device.

A memory traversal area 440 refers to a specific memory area specified by the memory offset generator 410 among an entire area of the device 430.

Figure 3:
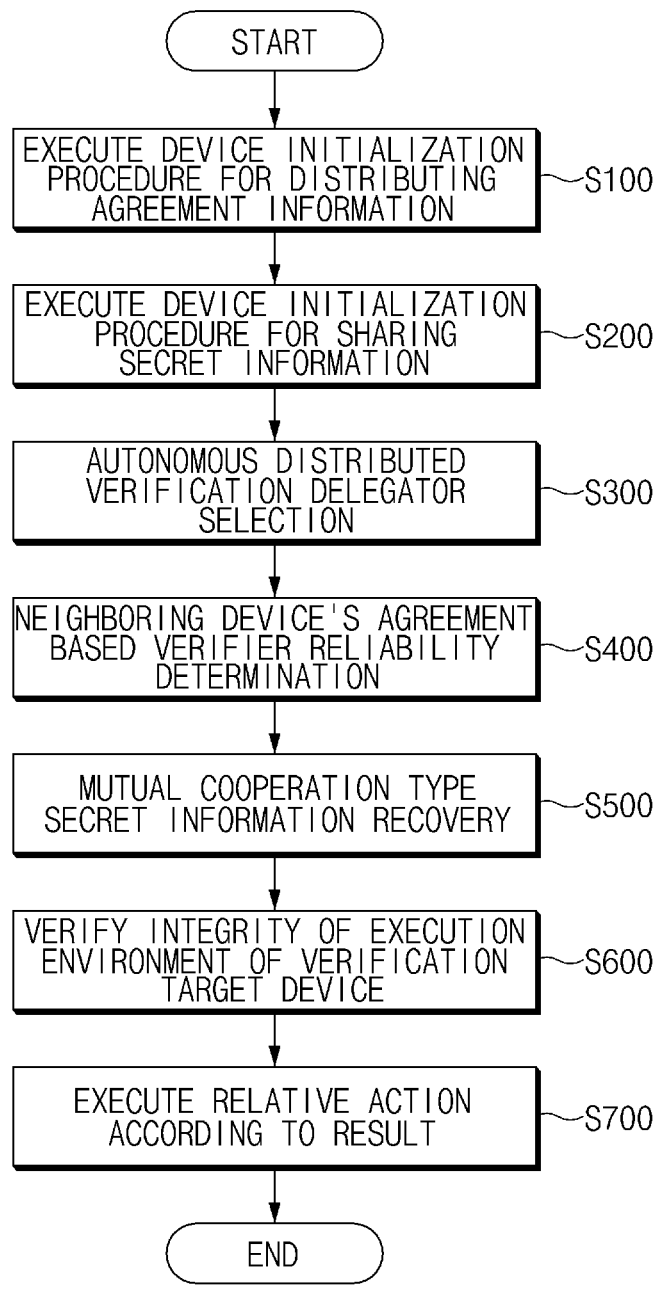
FIG. 3 is a flowchart illustrating an autonomous device integrity verification method based on a distributed verification delegator according to an embodiment of the present disclosure.

FIG. 5 is a flowchart illustrating in detail an execution process S200 of the secret information initialization procedure of FIG. 3.

The individual device to be arranged in the network may generate an encryption key, and divide a corresponding encryption key into n sub-keys as shown in the following Equation 5 (S201). The sub-keys may have a cryptographic characteristic that cannot recover an original encryption key (K) as long as t or more sub-keys are not secured, and thus, the complexity of key recovery of, an attacker may be increased.

Key sharing→$K=\{k_1,k_2, k_3, \ldots, k_n\}$ [Equation 5]

The individual device may generate its own secret information S; Secret) as shown in the following Equation 6, encrypt the generated secret information by using the encryption key generated at step S201, and obtain the encrypted secret information (M) (S202).

Secret: S

Encrypted secret: M [Equation 6]

The individual devices may hash the original secret information (S) generated at step S202 by using a hash function H(•) to obtain a digest value H(S), and delete the original secret information (S)(S203).

The individual device may encode the encrypted secret information (M) into n individual symbols through a data encoder (S204). The number of the encoded symbols in the present process may be set different from the divided encryption key, but, for the convenience of explanation, it is assumed that it is encoded into n symbols identical with the total number of sub-keys as shown in the following first formula of Equation 7. In addition, as long as a specific number of multiple symbols are not secured, an attacker cannot recover the encrypted secret information (M) value, and thus, the complexity of encrypted secret information (M) recovery of an attacker may be increased. As a result, in this step, the secret information fragment may be generated and stored as shown in the following second formula of Equation 7.

Data segment→$M=\{m_1,m_2, m_3, \ldots, m_n\}$

Secret fragment→$\{<m_1,k_1>,<m_2,k_2>, \ldots, >m_n, k_n>\}$ [Equation 7]

Power may be applied, and an individual device that normally operates an operating system may be arranged in the network environment (S205).

Here, the arrangement means that the individual device is physically mounted in a specific position and, logically, assigned with an address of a specific device network to be able to accomplish a data communication.

The arranged individual device may search the adjacent neighboring devices, and store the searched neighboring devices as a list (S206). When it is difficult to secure sufficient neighboring devices, the individual device may request and receive a list of adjacent neighboring, devices to and from the remote device management server.

The individual device may transmit the agreement information fragment to the neighboring device by using a neighboring device list (S207). At this time, each neighboring device may receive and keep a single agreement information fragment. In addition, it is not previously determined which neighboring device shall receive the agreement information fragment whose order is also not previously determined, and it is assumed that a random transmission occurs during the transmission. In addition, the agreement information fragment may not be stored in a local individual device, and may be all removed after the distribution is complete.

The individual device may distribute secret information fragment in the same manner as step S207 by using the neighboring device list (S208). However, unlike the step S207, during the service configuration, one or more secret information fragments may be stored in the local individual device as far as it does not affect the security according to the determination of the administrator.

Hereinafter, an autonomous distributed verification delegator selection method (S300) of FIG. 3 is described in detail with reference to FIG. 6.

The individual device which is initially arranged in the network, and which distributed all of the agreement information fragment and the secret information fragment to the neighboring device may initialize and activate a round timer for the selection of a verifier (S301). In more detail, the round timer may be synchronized through the neighboring device or the remote device management server.

When an execution environment integrity verification request event message is received from the remote device management server or the neighboring device, it proceeds to step S303. Otherwise, it waits in a reception state until it receives a corresponding verification request event message (S302).

The individual device verification may generate a verifier selection reference value (T) by using a round value (r) as an input of the verification delegator determination function CF (•) and this function (S303).

The individual device may generate an arbitrary random value θ. In this case, the θ should be selected as a value within the minimum and maximum values of a value T (S304).

The value T may be compared with the value θ. If the value θ is less than or equal to the value T, it may be returned to step S301, and wait in the reception state until the verification request event occurs (S305).

If the value θ is greater than the value T, the individual device may be selected as the verifier, and notify this to the neighboring device (S306).

Figure 7:
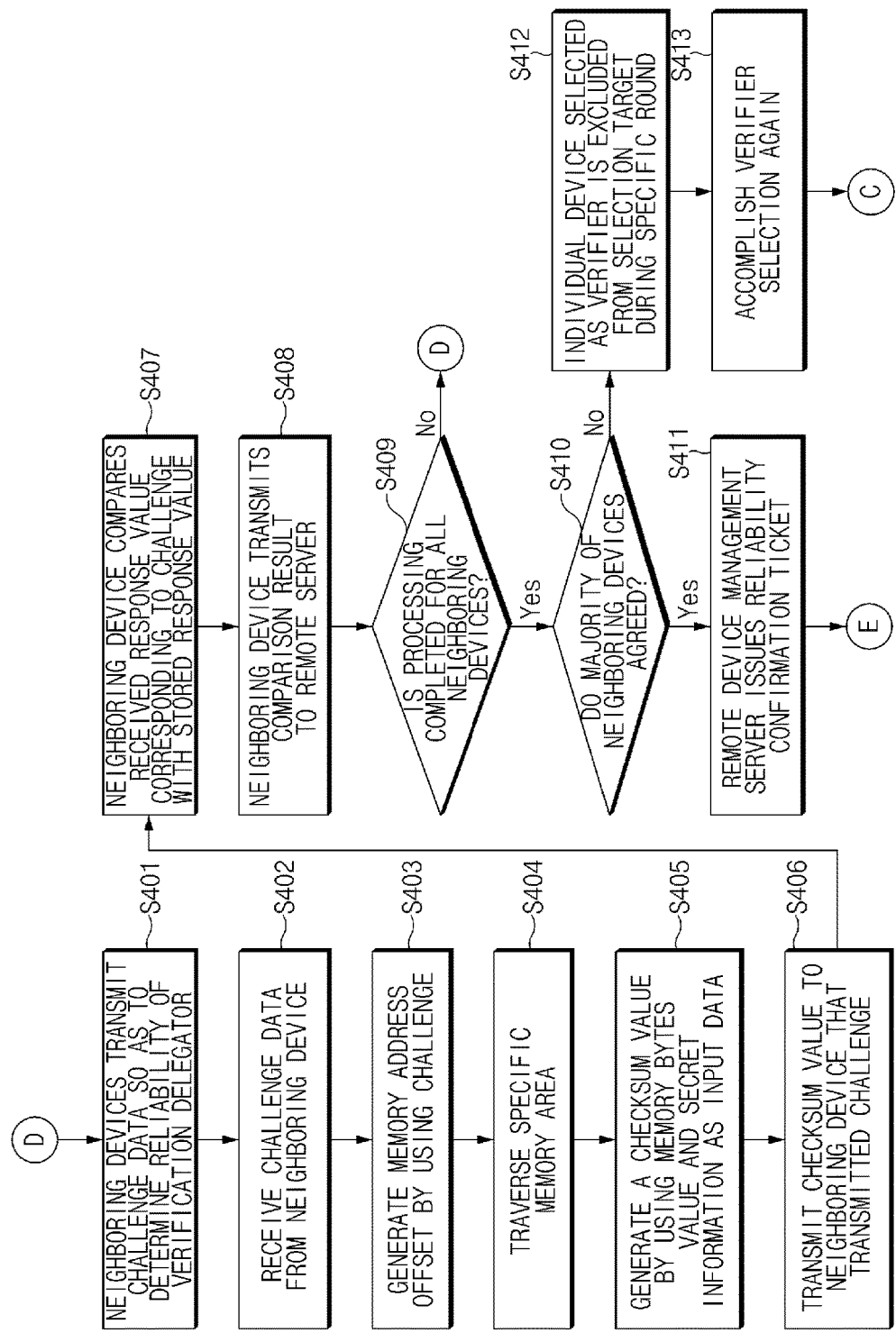
FIG. 7 is a flowchart illustrating in detail a mutual agreement based verification delegator reliability determination method of FIG. 3.

Hereinafter, a mutual agreement based verification delegator reliability determination method (S400) of FIG. 3 is described in detail with reference to FIG. 7.

The neighboring devices which received the verification delegator first selection message may transmit the challenge data to the verifier so as to determine the reliability of the verification delegator, and require a corresponding exact response value. At this time, the transmitted challenge data may be included in the agreement information fragment distributed to neighboring devices, when the individual device which is first selected as the verification delegator is arranged in the network (S401).

The individual device first selected as the verification delegator may receive the challenge data from the neighboring device (S402).

The individual device first selected as the verification delegator may generate an offset value indicative of a specific memory area by using the received challenge data (S403).

The individual device first selected as the verification delegator may traverse a specific memory area indicated by a memory offset value, and extract a memory Bytes value (S404).

The individual device first selected as the verification delegator may calculate a checksum value by using the extracted memory Bytes value (S405).

The individual device first selected as the verification delegator may transmit the obtained calculated checksum value to the neighboring device that transmitted a corresponding challenge value as a response value (S406).

The neighboring device may receive a response value corresponding to the challenge value, and compare with a pre-stored response value (S407).

The neighboring device may transmit the comparison result of the two response values to the remote device management server 140 (S408).

It is determined whether the above steps S401 to S408 are performed by all neighboring devices which hold the agreement information fragment of the individual device first selected as the verification delegator. If so, step S410 is executed. Otherwise, it proceeds to step S401 (S409).

The remote device management server 140 may check whether the first selected verification delegator got agreement of the majority of neighboring devices. If it got agreement, it proceeds to step S411. If not, it proceeds to step S412 (S410).

The remote device management server 140 may issue a reliability confirmation ticket for ensuring the first selected individual device as a final verification delegator (S411).

The individual device first selected as the verification delegator may not be selected as the final verification delegator, and may be excluded from a selection target during a specific round (S412).

Figure 6:
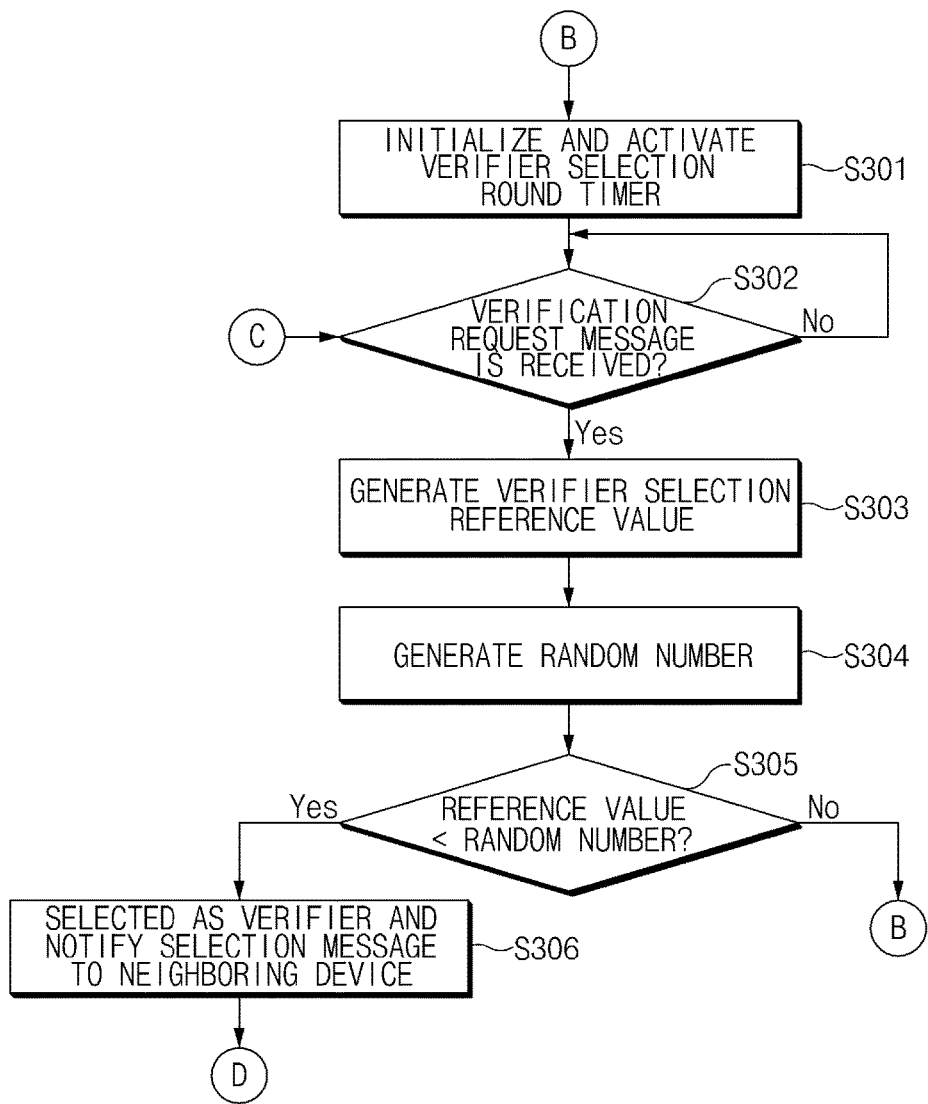
FIG. 6 is a flowchart illustrating in detail an autonomous distributed verification delegator selection method of FIG. 3.

In order to accomplish the selection of the verification delegator, it proceeds to step S302 of FIG. 6 (S413).

Figure 8:
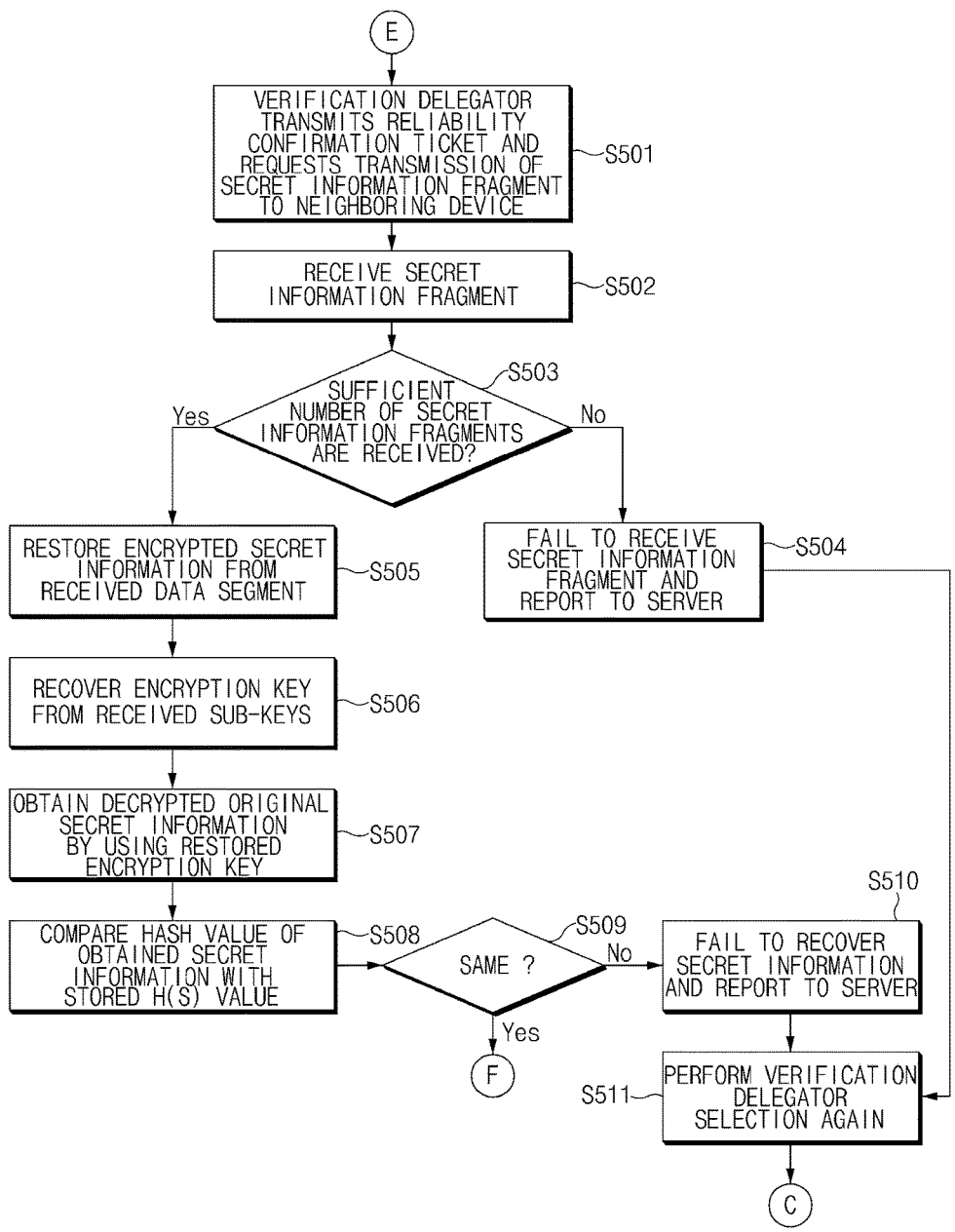
FIG. 8 is a flowchart illustrating in detail a mutual cooperation type secret information recovery method of FIG. 3.

Hereinafter, a mutual cooperation type secret information recovery method (S500) of FIG. 3 is described in detail with reference to FIG. 8.

The individual device selected as the final verification delegator may transmit the reliability confirmation ticket to the neighboring device to inform that it is a reliable verification delegator, and request the transmission of the secret information fragment (S501). At this time, when the secret information sharing initialization procedure performed in FIG. 5 is performed, the device receiving the above request may be limited to the neighboring devices which received a corresponding secret information fragment.

The individual device selected as the final verification delegator may receive the secret information fragment from the neighboring devices (S502).

The individual device selected as the final verification delegator may check whether a sufficient number of secret information fragments are received. Here, the sufficient number means the minimum number of data segments needed to encode into an encrypted secret information and, at the same time, means the minimum number of sub-keys to recover the original encryption key (S503). If sufficient secret information fragments are secured, it proceeds to step S505 and, otherwise, proceeds to step S504.

The individual device selected as the final verification delegator may determine that it failed to receive the sufficient number of secret information fragment, and report this state information to the remote device management server 140 (S504).

The individual device selected as the final verification delegator may separate the data segment from the received secret information fragment, and restore the encrypted secret information M by encoding the separated data segment (S505).

The individual device selected as the final verification delegator may separate the sub-keys from the received secret information fragment, and recover the encryption key from the separated sub-keys (S506).

The individual device selected as the final verification delegator may decrypt the encrypted secret information M by using the restored encryption key to obtain the original secret information S (S507).

The individual device selected as the final verification delegator may hash the obtained original secret information value, and compare with the pre-stored H(S) value (S508).

If the result of the comparison accomplished in the step S508 is the same, it proceeds to step S601 of FIG. 9A which is described later. If not, it proceeds to step S510 (S509).

The individual device selected as the final verification delegator may be able to identify that one or more devices among the neighboring devices that share the secret information fragment are damaged. The individual device selected as the final verification delegator may report that it failed to recover the secret information to the remote device management server 140 (S510).

If the final verification delegator failed to restore the original secret information, it proceeds to step S302 of FIG. 6 and re-performs the verification delegator selection process (S511).

Figure 9A:
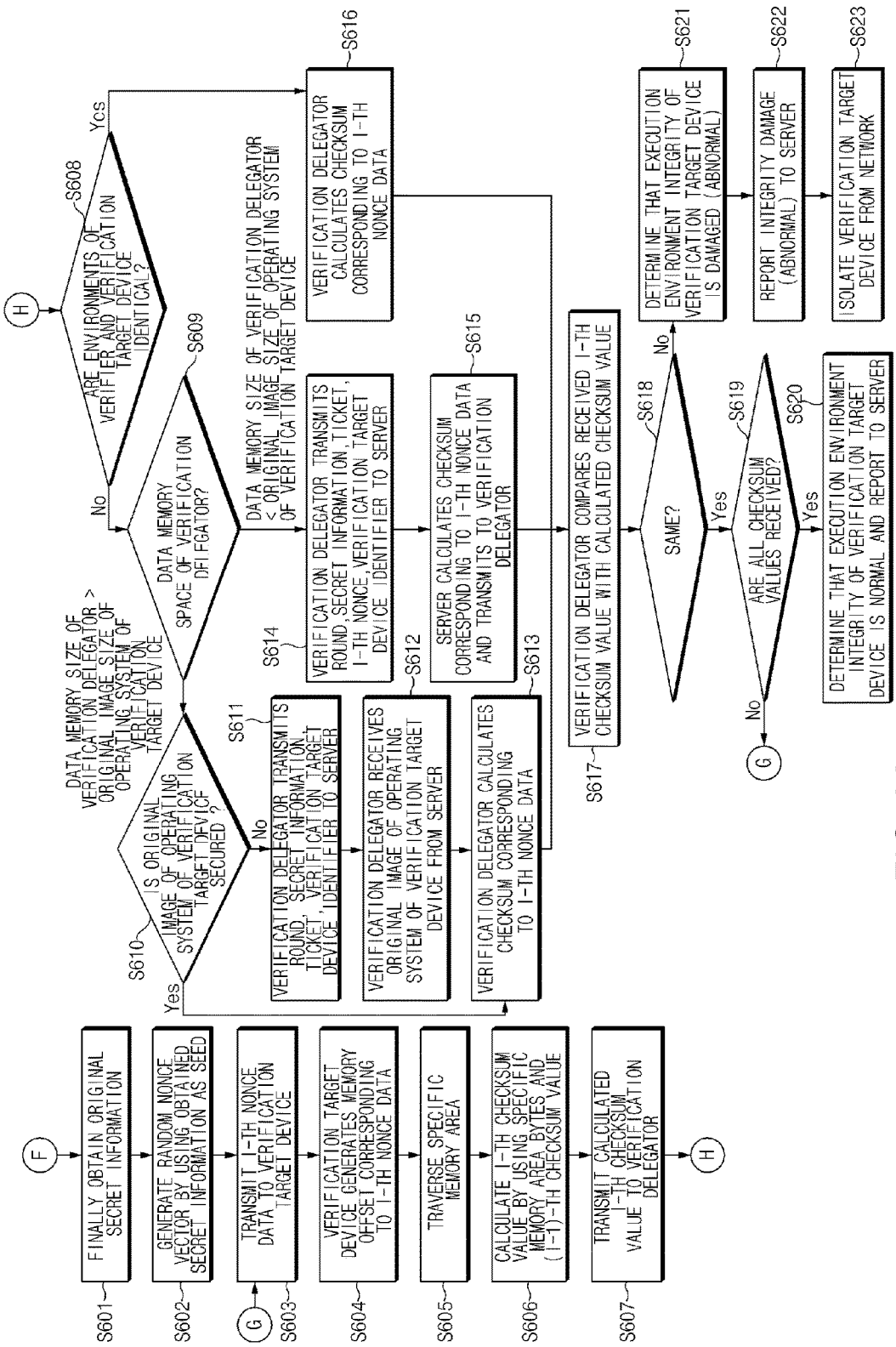
FIG. 9A is a flowchart illustrating an execution environment integrity verification method of the verification target device 130 of FIG. 3.

FIG. 9A is a flowchart illustrating an execution environment integrity verification method (S600) of the verification target device 130 of FIG. 3.

The verification delegator 120 may finally obtain the original secret information S (S601).

The verification delegator 120 may generate a random nonce vector (RNV) by using the obtained original secret information as a seed (S602).

The verification delegator 120 may extract a nonce value in order from the RNV and transmit to a verification target device (S603).

The verification target device 130 may generate a memory offset value so as to perform the area determination for the memory traversal by using the received nonce value (S604).

The verification target device 130 may traverse a specific memory area with reference to the memory offset value to extract the memory Bytes value (S605).

The verification target device 130 may calculate the current checksum value by using the extracted memory Bytes values and the previous checksum value (S606).

The verification target device 130 may transmit the calculated checksum value to the verification delegator (S607).

The verification delegator 120 may determine whether the operating system and the memory structure of the verification delegator and the verifier are the same as the verification target device 130 (S608). If the execution environment is the same, it proceeds to step S616. If not, it proceeds to step S609.

That is, if the execution environment is the same, it proceeds to step S616 and the verification delegator 120 may calculate the checksum value corresponding to a specific nonce value by traversing its own memory area (S616).

Meanwhile, if the execution environment is not the same, it proceeds to step S609, and the verification delegator 120 may determine whether there is a free memory space for storing a downloaded operating system image of the verification target device 130 (S609). If the free memory size is larger than the original image of the operating system of the verification target device 130, it proceeds to step S610. If not, it proceeds to step S614.

Then, the verification delegator 120 may check whether the original image of the operating system of the verification target device 130 is already secured (S610). If it is already secured, it proceeds to step S613. If not, it proceeds to step S611.

The verification delegator 120 may transmit information such as a round value in which a corresponding verification event occurs, an original secret information value, a reliability confirmation ticket, a verification target device identifier, and the like to the remote device management server 140 (S611). The type of the data which the verification delegator 120 transmits to the remote device management server 140 in this step may be easily reduced or expanded depending on the objective of the service.

The verification delegator 120 may receive the original image of the operating system of the verification target device 130 from the remote device management server 140 (S612).

The verification delegator 120 may calculate a checksum value corresponding to a specific nonce value in the same way as the verification device (step S602 to step S606) (S613).

The verification delegator 120 may transmit the round value, the original secret information value, the reliability confirmation ticket, a received specific nonce value, and the verification target device identifier to the remote device management server 140 (S614).

The remote device management server 140 may calculate a checksum value corresponding to a specific nonce data and transmit to the verification delegator 120 (S615).

When the above-described steps S616, S615, and S613 are completed, the verification delegator 120 may compare the checksum value received from the verification target device with the checksum value calculated by itself or received from the remote device management server (S617).

Based on the comparison determination result, if the checksum values are the same, it proceeds to step S619. If not, it proceeds to step S621 (S618).

If the checksum values are not the same in the step S618, the verification delegator 120 may determine that the execution environment integrity of the verification target device 130 is damaged (S621).

Then, the verification delegator 120 may report the determination result of the integrity damage to the remote device management server 140 (S622).

The remote device management server 140 may isolate the verification target device from the device network (S623).

Meanwhile, when the checksum values are the same in the step S618, the verification delegator 120 may determine whether all checksum values corresponding to the RNV generated in step S602 are received from the neighboring device (S619).

If all checksum values are received as a response value, it proceeds to step S620. Otherwise, it proceeds to step S603, and repeatedly performs a procedure of transmitting a remaining nonce value to the verification target device.

If all checksum values are received as a response value at step S619, the verification delegator 120 may determine that the execution environment integrity of the verification target device 130 is normal, and report this to the remote device management server 140 (S620).

Figure 9B:
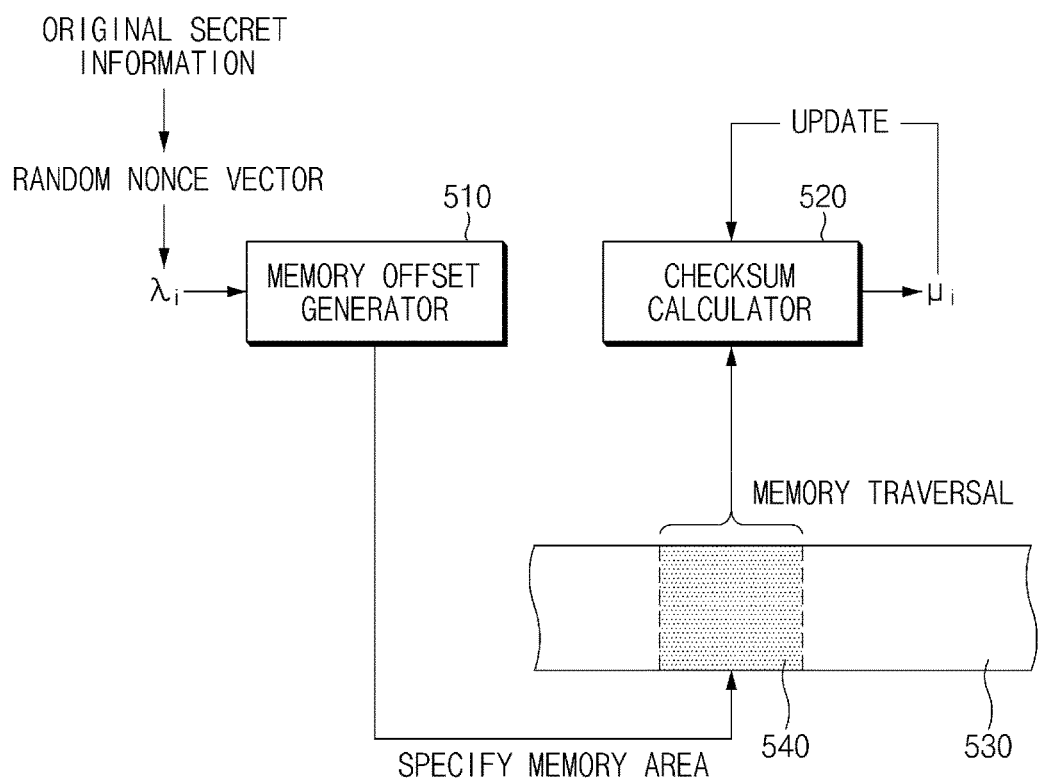
FIG. 9B is a diagram illustrating an example of generating an integrity related checksum value for the verification target device of FIG. 9A.

FIG. 9B is a diagram illustrating an example of generating an integrity related checksum value for the verification target device 130 of FIG. 9A.

When an original secret information which is the original value of the secret information of the verification delegator obtained at step S601 of FIG. 9A is inputted, the verification delegator 120 may generate a random nonce vector generated at step S602 of FIG. 9A by using the original secret information as a seed.

The verification delegator 120 may extract $\lambda i$ which is a i-th nonce value from the random nonce vector to transmit to a memory offset generator 510.

The memory offset generator 510 may serve to receive the nonce value as an input value to convert into an offset value that specifies a specific memory area.

A checksum calculator 520 may serve to receive the memory Bytes value and the previous checksum value as an input value and calculate a specific checksum value. The checksum calculator 520 may be considered as an extension type of the checksum calculator 4200 described in the above FIG. 4B.

The checksum calculator 520 may output the checksum value $\mu i$ corresponding to the i-th nonce.

A memory traversal area 540 refers to a memory area specified by a memory offset value extracted from the memory offset generator 510.

A device memory 530 refers to a memory device for storing the data and the program of the verification delegator or a memory device for storing the memory layout and the operating system image of the verification target device 130 received from the remote device management server 140.

The configuration and the embodiment of the present disclosure are not limited to the above description, and the present disclosure provides a technical flexibility which can be expanded and modified to be suitable for the normal application service environment for a wireless, a personal or a mobile device.

Thus, in the present disclosure, the remote device management server 140 may previously generate the agreement information relating to a mutual agreement protocol, designate and announce an arbitrary device that requires the integrity verification, and finally determine a first selected verification delegator to issue a ticket, the individual devices may participate in the verification delegator selection process and the reliability verification process, and the device selected as the verification delegator may perform the attestation function for the verification target device, so that it is possible to provide a structural advantage of distributing the decision making structure of the integrity verification relying on a single entity.

In addition, when performing the verification process for the target device, the present disclosure provides a method of minimizing the direct intervention of the remote device management server, by utilizing the reliably selected verification delegator.

Further, the present disclosure not only provides an excellent calculation ability for the agreement information relating to the mutual agreement protocol, but also relies on the remote device management server which is the most reliable external entity, so that it is possible to prevent the degradation of the performance due to the attestation procedure of verification delegator.

In addition, if the selected verification delegator does not receive t or more secret information fragments from the neighboring device, the original secret information may be recovered. Therefore, there is a security advantage in that even if an attacker having a malicious purpose acquires a maximum t−1 secret information fragments, the secret information cannot be recovered. In addition, even though the verification delegator receives t or more secret information fragments from the neighboring device, when the secret information different from the original secret information value is recovered, it can be checked that at least one neighboring device is damaged by a malicious code.

In addition, in the present disclosure, even if a specific device is selected as the verification delegator at a specific round, when it does not get an agreement on the reliability confirmation determination from the neighboring device, a corresponding device may not be given an authority to recover the secret information. In conclusion, it cannot perform the attestation function. In addition, it is advantageous in that the attacker is difficult to guess the device that serves as the verification delegator.

In addition, the present disclosure provides an execution environment (memory) integrity verification method which can be fully applied to heterogeneous devices regardless of the kind of hardware and the operating system of the device.

Figure 10:
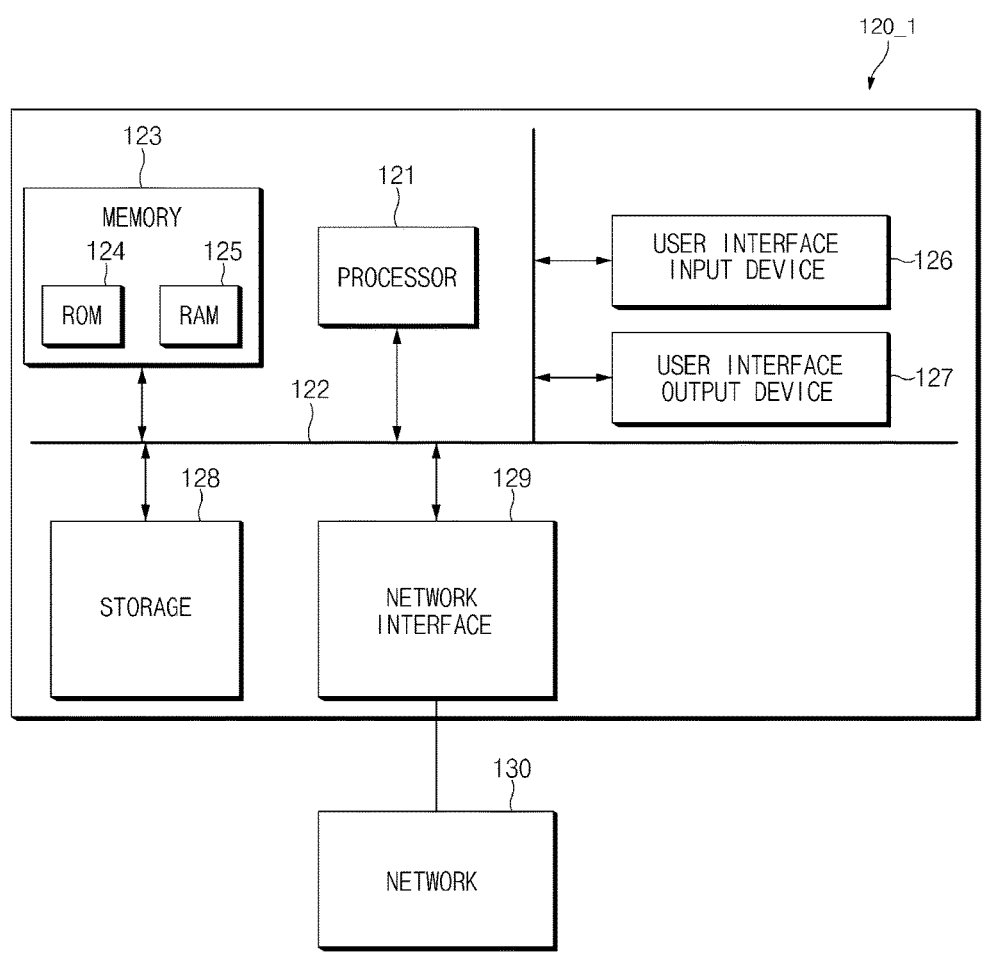
FIG. 10 is a block diagram illustrating a computer system implementing a distributed delegator based attestation method for an autonomous device integrity verification according to an embodiment of the present disclosure.

FIG. 10 is a block diagram illustrating a computer system implementing a distributed delegator based attestation method for an autonomous device integrity verification according to an embodiment of the present disclosure.

Referring to FIG. 10, a computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and a Random Access Memory (RAM).

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM.

The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

This technology can guarantee the reliability of device operation by performing the integrity attestation procedure for the execution environment of the individual device based on the mutual cooperation of neighboring devices in the network environment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for performing an integrity verification of an integrity of devices in a network, the system comprising:
   a remote device management server;
   a plurality of individual devices comprising a first individual device and a second individual device which being connected with the remote device management server via the network, wherein
   the first individual device is targeted as a verification target device of the plurality of individual devices;
   the second individual device is selected as a verification delegator and configured to verify an integrity of the verification target device of the plurality of individual devices; and
   in response to detection of a remote device management server selects the second individual device of the plurality of individual devices as a verification delegator, the remote device management server is configured to receive a result of integrity verification of the first individual device, the integrity verification being performed by the second individual device,
   wherein the second individual device is configured to exchange challenge-response data with other individual devices to obtain agreements on the selection of the verification delegator, when the second individual device satisfies a condition of a verification delegator candidate,
   wherein each of the other individual devices is configured to transmit agreement to the remote device management server,
   wherein the remote device management server is configured to select the second individual device as the verification delegator when the remote device management server receives a predetermined number or more of agreements from the other individual devices, wherein the second individual device as the verification delegator is configured to collect secret information from the other individual devices, the secret information being internally generated from the other individual devices, to restore the collected secret information to generate a challenge data based on the secret information and to verify the integrity of the verification target device using the challenge data, wherein the second individual device satisfies the condition of the verification delegator candidate when a first value equal to or greater than a second value, wherein the first value is randomly generated by the second individual device and is in a range between a minimum value and a maximum value of an output value of a verification delegator determination function, the output value being determined using the following equation:

$$T=CF(r),$$

wherein the output value T is generated by using a round value (r) as an input of a verification delegator determination function CF, and wherein the second value is generated by the second individual device and is an output value of the verification delegator determination function with a round timer value of the second individual device as an input value, and wherein the second individual device transmits the challenge data to the first individual device which is a verification target device in a form of nonce, and verifies an integrity of the first individual device by checking a response of the first individual device.

2. The system of claim 1, further comprising a third individual device of the plurality of individual devices.

3. The system of claim 2, wherein the remote device management server generates agreement information of the plurality of individual devices and distributes the agreement information to the plurality of individual devices.

4. The system of claim 3, wherein the remote device management server receives the agreement information of the second individual device from the third individual device and confirms the verification delegator selection of the second individual device in response to detection of the second individual device being selected as the verification delegator.

5. The system of claim 4, wherein each of the plurality of individual devices generates secret information and distributes the secret information to the other plurality of individual devices.

6. The system of claim 1, wherein each of the plurality of individual devices comprises:
a random data generator configured to generate at least one of the secret information, a nonce, and an encryption key;
a verification data repository configured to store the agreement information received from the remote device management server, the secret information, the nonce, and the encryption value;
a memory traversal unit configured to perform memory scan and data extraction when evaluating a reliability of the verification delegator and measuring an integrity of the verification target device; and
a checksum calculator configured to calculate a checksum for evaluating the reliability of the verification delegator and measuring the integrity of the verification target device.

7. The system of claim 6, further comprising a verification delegator selector configured to generate a challenge data based on the secret information in response to detection of an individual device of the plurality of individual devices being a verification delegator.

8. The system of claim 7, further comprising a verifier reliability determiner configured to determine the reliability of the second individual device in response to detection of an individual device of the plurality of individual devices being operated as a third individual device.

9. The system of claim 8, further comprising a distribution verification determiner configured to perform an integrity verification for the first individual device in response to receipt of a response to the challenge from the first individual device which being the verification target device when an individual device of the plurality of individual devices being operated as a second individual device.

10. he system of claim 9, further comprising a neighboring device seeker configured to search a device which is first arranged in a network among the plurality of devices.

11. An individual device for performing an integrity verification by being linked with a remote device management server, the individual device comprising:
a plurality of individual devices comprising a first individual device and a second individual device which being connected with the remote device management server via the network, wherein
the first individual device is targeted as a verification target device of the plurality of individual devices;
the second individual device is selected as a verification delegator and configured to verify an integrity of the verification target device of the plurality of individual devices;
a random data generator configured to generate at least one of secret information, a nonce, and an encryption key;
a verification data repository configured to store agreement information received from the remote device management server, the secret information, the nonce, and the encryption value;
a memory traversal unit configured to perform memory scan and data extraction in response to detection of a reliability of a verification delegator and an integrity of a verification target device;
a checksum calculator configured to calculate a checksum for evaluating the reliability of the verification delegator and measuring the integrity of the verification target device;
a verification delegator selector configured to generate a challenge data based on the secret information in response to detection of the individual device being selected as the verification delegator;
a verifier reliability determiner configured to determine a reliability of the individual device selected as the verification delegator; and
a distribution verification determiner configured to transmit a challenge data to the verification target device, and to perform an integrity verification for the verification target device in response to receipt of a response to a challenge from the verification target device,
wherein the second individual device is configured to exchange challenge-response data with other individual devices to obtain agreements on the selection of the verification delegator, when the second individual device satisfies a condition of a verification delegator candidate, wherein each of the other individual devices is configured to transmit agreement to the remote device management server, wherein the remote device management server is configured to select the second individual device as the verification delegator when the remote device management server receives a predetermined number or more of agreements from the other individual devices, wherein the second individual device as the verification delegator is configured to collect secret information from the other individual devices, the secret information being internally generated from the other individual devices, to restore the collected secret information to generate a challenge data based on the secret information and to verify the integrity of the verification target device using the challenge data, wherein the second individual device satisfies the condition of the verification delegator candidate when a first value equal to or greater than a second value, wherein the first value is randomly generated by the second individual device and is in a range between a minimum value and a maximum value of an output value of a verification delegator determination function, the output value being determined using the following equation:

$$T=CF(r),$$

wherein the output value T is generated by using a round value (r) as an input of a verification delegator determination function CF, and wherein the second value is generated by the second individual device and is an output value of the verification delegator determination function with a round timer value of the second individual device as an input value, and wherein the second individual device transmits the challenge data to the first individual device which is a verification target device in a form of nonce, and verifies an integrity of the first individual device by checking a response of the first individual device.

12. A method for performing an integrity verification of an individual device based on a distributed delegator, which is performed by linking a plurality of individual devices connected based on a network with a remote device management server, the method comprising:

receiving a request of integrity verification with respect to a verification target device which is one of the plurality of individual devices;

selecting a verification delegator from among the plurality of individual devices by excluding the verification target device; and verifying an integrity of the verification target device, wherein the verifying an integrity of the verification target device is performed by the following steps:

collecting secret information from neighboring devices of the verification target device by the verification delegator, the secret information being internally generated from the plurality of individual devices;

generating a challenge data based on the secret information and transmitting to the verification target device;

receiving response from the verification target device; and verifying the integrity of the verification target device based on the response, wherein the selecting the verification delegator comprises selecting an individual device among the plurality of individual devices that generate a first value equal to or greater than a second value, wherein the first value is randomly generated by the second individual device and is in a range between a minimum value and a maximum value of an output value of a verification delegator determination function, the minimum and maximum value being determined using the following equation:

$$T=CF(r),$$

wherein the output value T is generated by using a round value (r) as an input of a verification delegator determination function CF, and wherein the second value is generated by the second individual device and is an output value of the verification delegator determination function with a round timer value of the second individual device as an input value, and wherein the second individual device transmits the challenge data to the first individual device which is a verification target device in a form of nonce, and verifies an integrity of the first individual device by checking a response of the first individual device.

13. The method of claim 12 further comprising:

storing agreement information distributed from the remote device management server; and generating secret information to store and share.

14. The method of claim 13, wherein selecting a verification delegator comprises:

generating a verification selection reference value for selecting the verification delegator and comparing with a preset arbitrary random value; and determining that it is possible to be selected as the verification delegator and reporting to the remote device management server, in response to detection of the verification selection reference value being less than the random value.

15. The method of claim 14, wherein selecting a verification delegator further comprises finally selecting the individual device as the verification delegator in response to receipt a final selection result by agreement information of the verification target device or neighboring devices of the verification delegator among, the plurality of individual devices from the remote device management server.

16. The method of claim 12, further comprising reporting an integrity verification result of the verification target device to the remote device management server by the verification delegator.

* * * * *